United States Patent
Behm et al.

(10) Patent No.: US 7,899,566 B2
(45) Date of Patent: *Mar. 1, 2011

(54) FACTORY LEVEL AND TOOL LEVEL ADVANCED PROCESS CONTROL SYSTEMS INTEGRATION IMPLEMENTATION

(75) Inventors: Gary W. Behm, Hopewell Junction, NY (US); Emily M. Hwang, Hopewell Junction, NY (US); Yue Li, Hopewell Junction, NY (US); Teresita Q. Magtoto, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/348,026

(22) Filed: Jan. 2, 2009

(65) Prior Publication Data

US 2009/0118851 A1 May 7, 2009

Related U.S. Application Data

(63) Continuation of application No. 11/460,450, filed on Jul. 27, 2006, now Pat. No. 7,489,980, which is a continuation-in-part of application No. 11/161,603, filed on Aug. 9, 2005, now Pat. No. 7,113,845.

(51) Int. Cl.
*G06F 19/00* (2006.01)
(52) U.S. Cl. .......................... 700/96; 700/121
(58) Field of Classification Search .............. 700/96, 700/121
See application file for complete search history.

(56) References Cited

U.S. PATENT DOCUMENTS

| 6,466,435 | B2 | 10/2002 | Dong |
| 6,466,935 | B1 | 10/2002 | Stuart |
| 6,622,101 | B1 | 9/2003 | Oechsner et al. |
| 6,640,148 | B1 | 10/2003 | Miller et al. |
| 6,678,668 | B2 | 1/2004 | Fisher et al. |
| 6,728,587 | B2 | 4/2004 | Goldman et al. |
| 7,113,845 | B1 | 9/2006 | Behm et al. |
| 7,280,885 | B1 | 10/2007 | Brown et al. |
| 7,489,980 | B2 * | 2/2009 | Behm et al. ................ 700/96 |
| 2002/0082738 | A1 | 6/2002 | Goldman et al. |
| 2002/0199082 | A1 | 12/2002 | Shanmugasundram et al. |
| 2003/0220709 | A1 | 11/2003 | Hartman et al. |
| 2004/0034555 | A1 | 2/2004 | Dismukes et al. |
| 2006/0235554 | A1 | 10/2006 | Ellis et al. |
| 2007/0129839 | A1 | 6/2007 | Tsubakida et al. |

* cited by examiner

*Primary Examiner* — Ryan A Jarrett
(74) *Attorney, Agent, or Firm* — Joseph J. Petrokaitis; Hoffman Warnick LLC

(57) ABSTRACT

Integration of factory level advanced process control (FL-APC) system and tool level advanced process control (TL-APC) system using selectable APC operation modes indicating different operational settings for the FL-APC system and at least one TL-APC system is disclosed. During operation, the FL-APC system controls operation of the TL-APC system. The invention allows a manufacturing execution system (MES) to have additional capability to run the process control functions at FL-APC system and/or TL-APC system, and allows integration of a variety of different tools with a TL-APC system. An implementation method, system and program product are also disclosed.

18 Claims, 14 Drawing Sheets

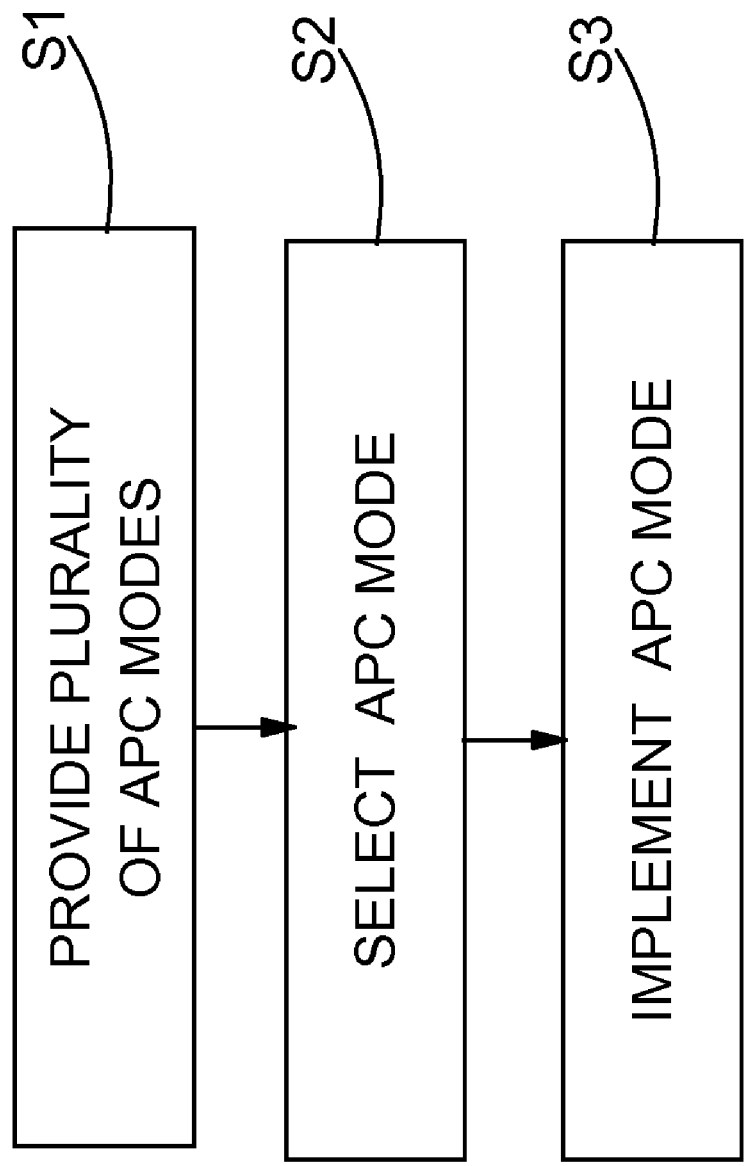

Factory Level Control without Tool Level Control (with External and Integrated Metrology)

| APC Factory Level | APC Tool Level | APC Criteria | Factory Level Mode | Tool Level Mode | Scenarios |
|---|---|---|---|---|---|
| Yes | No | L2L | Active | Disable | Factory level lot-to-lot control with external metrology (no tool level APC) |
| Yes | No | W2W | Active | Disable | Factory level wafer-to-wafer control with external metrology (no tool level APC) |
| Yes | No | L2L | Active | Disable | Factory level lot-to-lot control with tool internal metrology (no tool level APC) |
| Yes | No | W2W | Active | Disable | Factory level wafer-to-wafer control with tool internal metrology (no tool level APC) |

FIG. 5

Tool Level Control without Factory Level Control (with External and Internal Metrology)

| APC Factory Level | APC Tool Level | APC Criteria | Factory Level Mode | Tool Level Mode | Scenarios |
|---|---|---|---|---|---|
| No | Yes | L2L | Passive | Active | Tool level lot-to-lot control with external metrology (no factory level APC) |
| No | Yes | W2W | Passive | Active | Tool level wafer-to-wafer control with external metrology (no factory level APC) |
| No | Yes | L2L | Passive | Active | Tool level lot-to-lot control with tool internal metrology (no factory level APC) |
| No | Yes | W2W | Passive | Active | Tool level wafer-to-wafer control with tool internal metrology (no factory level APC) |

FIG. 6

Factory Level Control with Tool Level Control
(FLC – External and TLC – Tool Internal Metrology)

| APC Factory Level | APC Tool Level | APC Criteria | Factory Level Mode | Tool Level Mode | Scenarios |
|---|---|---|---|---|---|
| Yes | Yes | L2L & W2W | Active | Active | Factory level lot-to-lot control with external metrology<br>Tool level wafer-to-wafer control with tool internal metrology |
| Yes | Yes | W2W & W2W | Active | Active | Factory level wafer-to-wafer control with external metrology<br>Tool level wafer-to-wafer control with tool internal metrology |
| Yes | Yes | W2W & L2L | Active | Active | Factory level wafer-to-wafer control with external metrology<br>Tool level lot-to-lot control with tool internal metrology |
| Yes | Yes | L2L & L2L | Active | Active | Factory level lot-to-lot control with external metrology<br>Tool level lot-to-lot control with tool internal metrology |

FIG. 7

Factory Level Control with Tool Level Control
(FLC –Internal and TLC – External Metrology)

| APC Factory Level | APC Tool Level | APC Criteria | Factory Level Mode | Tool Level Mode | Scenarios |
|---|---|---|---|---|---|
| Yes | Yes | L2L & W2W | Active | Active | Factory level lot-to-lot control with tool internal metrology<br>Tool level wafer-to-wafer control with external metrology |
| Yes | Yes | W2W & W2W | Active | Active | Factory level wafer-to-wafer control with tool internal metrology<br>Tool level wafer-to-wafer control with external metrology |
| Yes | Yes | W2W & L2L | Active | Active | Factory level wafer-to-wafer control with tool internal metrology<br>Tool level lot-to-lot control with external metrology |
| Yes | Yes | L2L & L2L | Active | Active | Factory level lot-to-lot control with tool internal metrology<br>Tool level lot-to-lot control with external metrology |

FIG. 8

Factory Level Control with Tool Level Control (with External Metrology only)

| APC Factory Level | APC Tool Level | APC Criteria | Factory Level Mode | Tool Level Mode | Scenarios |
|---|---|---|---|---|---|
| Yes | Yes | L2L & W2W | Active | Active | Factory level lot-to-lot control with external metrology<br>Tool level wafer-to-wafer control with external metrology |
| Yes | Yes | W2W & W2W | Active | Active | Factory level wafer-to-wafer control with external metrology<br>Tool level wafer-to-wafer control with external metrology |
| Yes | Yes | W2W & L2L | Active | Active | Factory level wafer-to-wafer control with external metrology<br>Tool level lot-to-lot control with external metrology |
| Yes | Yes | L2L & L2L | Active | Active | Factory level lot-to-lot control with external metrology<br>Tool level lot-to-lot control with external metrology |

FIG. 9

Factory Level Control with Tool Level Control (with Tool Internal Metrology only)

| APC Factory Level | APC Tool Level | APC Criteria | Factory Level Mode | Tool Level Mode | Scenarios |
|---|---|---|---|---|---|
| Yes | Yes | L2L & W2W | Active | Active | Factory level lot-to-lot control with tool internal metrology<br>Tool level wafer-to-wafer control with tool internal metrology |
| Yes | Yes | W2W & W2W | Active | Active | Factory level wafer-to-wafer control with tool internal metrology<br>Tool level wafer-to-wafer control with tool internal metrology |
| Yes | Yes | W2W & L2L | Active | Active | Factory level wafer-to-wafer control with tool internal metrology<br>Tool level lot-to-lot control with tool internal metrology |
| Yes | Yes | L2L & L2L | Active | Active | Factory level lot-to-lot control with tool internal metrology<br>Tool level lot-to-lot control with tool internal metrology |

FIG. 10

Factory Level Simulation with External Metrology

| APC Factory Level | APC Tool Level | APC Criteria | Factory Level Mode | Tool Level Mode | Scenarios |
|---|---|---|---|---|---|
| Yes | No | L2L | Passive | Disable | Factory level lot-to-lot simulation with external metrology (no tool level APC) |
| Yes | Yes | L2L | Passive | Active | Factory level lot-to-lot simulation with external metrology while tool level wafer-to-wafer control with tool internal metrology |
| Yes | No | W2W | Passive | Disable | Factory level wafer-to-wafer simulation with external metrology (no tool level APC) |
| Yes | Yes | W2W | Passive | Active | Factory level wafer-to-wafer simulation with external metrology while tool level wafer-to-wafer control with tool internal metrology |

FIG. 11

Factory Level Simulation w/ Tool Internal Metrology

| APC Factory Level | APC Tool Level | APC Criteria | Factory Level Mode | Tool Level Mode | Scenarios |
|---|---|---|---|---|---|
| Yes | No | L2L | Active | Disable | Factory level lot-to-lot simulation with tool internal metrology (no tool level APC) |
| Yes | Yes | L2L | Active | Active | Factory level lot-to-lot simulation with tool internal metrology while tool level wafer -to- wafer control with tool internal metrology |
| Yes | No | W2W | Active | Disable | Factory level wafer-to-wafer simulation with tool internal metrology (no tool level APC) |
| Yes | Yes | W2W | Active | Active | Factory level wafer-to-wafer simulation with tool internal metrology while tool level wafer -to- wafer control with tool internal metrology |

FIG. 12 ced.
FACTORY LEVEL AND TOOL LEVEL ADVANCED PROCESS CONTROL SYSTEMS INTEGRATION IMPLEMENTATION This application is a continuation of Ser. No. 11/460,450, now U.S. Pat. No. 7,489,980, issued Feb. 10, 2009 as which is a continuation-in-part of Ser. No. 11/161,603, Aug. 9, 2005 U.S. Pat. No. 7,113,845, issued Sep. 26, 2006.

BACKGROUND OF THE INVENTION

1. Technical Field

The present invention relates generally to manufacturing control systems, and more particularly, to integration of a factory level advanced process control (APC) system and a local tool level APC system.

2. Related Art

Manufacturers, especially semiconductor fabricators, who implement advanced process control (APC) systems, generally do so at the factory level. APC systems take measurements of particular structures before and after a processing step and provide corrections to recipes for feeding forward and/or feeding back to tools to achieve a better product. Typically, factory level APC systems are implemented such that individual tools are controlled by the factory level APC system. Presently, however, tool vendors are beginning to implement embedded APC systems in tools. For example, FIG. 1 shows a typical semiconductor fabricator environment 10 including a number of tools 12, a manufacturing execution system (MES) 14 that controls all product movements through environment 10, i.e., it schedules product movements, a factory level APC (FL-APC) system 16, and an equipment interface (EI) 18 that interfaces between MES 14 and different tools. Although not shown, middleware may be present for communication between MES 14, FL-APC system 16 and EI 18. Each tool 12 includes process equipment 20 particular to its function, e.g., an etching chamber, gas source, appropriate electronics, etc. for an etching tool. Metrology instruments may be provided as an integrated metrology (IM) system 22 and/or external metrology systems 24 and 26.

Presently, tool manufacturers are beginning to implement advanced process control systems on their tools. Accordingly, each tool 12 may now include a tool level APC (TL-APC) system 30. Although new tool level APC systems hold promise for increased efficiency, they also present a challenge in that no effective and standard method exists to coordinate and manage the process control functions between the factory level APC system and the tool level APC system. Accordingly, each tool with a new tool level APC system represents a set of customization challenges relative to integration with the factory level APC system. In addition, the variety of scenarios that must be addressed is based on which of the following is desired: FL-APC and/or TL-APC control, external and/or integrated metrology, lot-to-lot and/or wafer-to-wafer evaluation. As a result, the customization challenges are immense.

In view of the foregoing, there is a need in the art for a solution for integrating factory level and tool level APC systems.

SUMMARY OF THE INVENTION

Integration of factory level advanced process control (FL-APC) system and tool level advanced process control (TL-APC) system using selectable APC operation modes indicating different operational settings for the FL-APC system and at least one TL-APC system is disclosed. During operation, the FL-APC system controls operation of the TL-APC system. The invention allows a manufacturing execution system (MES) to have additional capability to run the process control functions at FL-APC system and/or TL-APC system, and allows integration of a variety of different tools with a TL-APC system with or without integrated metrology. An implementation method, system and program product are also disclosed.

A first aspect of the invention is directed to a method comprising the steps of: providing a plurality of advanced processing control (APC) operation modes for selection by a manufacturing execution system that interacts with at least one of: a) a factory level advanced processing control (FL-APC) system, and b) at least one tool level advanced processing control (TL-APC) system, wherein the plurality of APC operation modes indicate different operational settings for the FL-APC system and the at least one TL-APC system; and implementing a selected APC operation mode.

A second aspect of the invention includes a system comprising: a manufacturing execution system (MES); a factory level advanced process control (FL-APC) system coupled to the MES; at least one tool including a tool level advanced process control (TL-APC) system coupled to the FL-APC system; and a plurality of selectable advanced process control (APC) operation modes, each APC operation mode indicating an operational setting for the FL-APC system and the TL-APC system.

A third aspect of the invention related to a system comprising: a manufacturing execution system (MES); a factory level advanced process control (FL-APC) system coupled to the MES; at least one tool including a tool level advanced process control (TL-APC) system coupled to the FL-APC system; and a plurality of selectable advanced process control (APC) operation modes, each APC operation mode indicating an operational setting for the FL-APC system and the TL-APC system.

A fourth aspect of the invention is directed to a computer program product comprising computer readable medium including a computer readable program, wherein the computer readable program when executed on a computer causes the computer to: provide a plurality of advanced processing control (APC) operation modes for selection by a manufacturing execution system that interacts with at least one of: a) a factory level advanced processing control (FL-APC) system, and b) at least one tool level advanced processing control (TL-APC) system, wherein the plurality of APC operation modes indicate different operational settings for the FL-APC system and the at least one TL-APC system; and implement a selected APC operation mode.

A fifth aspect of the invention is directed to a method of implementing an advanced process control (APC) operation mode for at least one of a factory level advanced processing control (FL-APC) system, and at least one tool level advanced processing control (TL-APC) system, the method comprising: receiving a request from a manufacturing execution system (MES) for at least one APC system, the request including the APC operation mode and required data to perform a recipe parameter adjustment (RPA) for the at least one APC system; determining a status of the at least one APC system requested; determining whether the at least one APC system has necessary data to perform the RPA; and transmitting the required data to the at least one APC system.

A sixth aspect of the invention provides a system for implementing an advanced process control (APC) operation mode for at least one of a factory level advanced processing control (FL-APC) system, and at least one tool level advanced processing control (TL-APC) system, the system comprising: a receiver for receiving a request from a manufacturing execution system (MES) for at least one APC system, the request including the APC operation mode and required data to perform a recipe parameter adjustment (RPA) for the at least one APC system; a status determinator for determining a status of the at least one APC system requested; a data determinator for determining whether the at least one APC system has necessary data to perform the RPA; and a data transmitter for transmitting the required data to the at least one APC system.

A seventh aspect of the invention is directed to a computer program product comprising a computer readable medium including a computer readable program for implementing an advanced process control (APC) operation mode for at least one of a factory level advanced processing control (FL-APC) system, and at least one tool level advanced processing control (TL-APC) system, wherein the computer readable program when executed on a computer causes the computer to perform the following: receiving a request from a manufacturing execution system (MES) for at least one APC system, the request including the APC operation mode and required data to perform a recipe parameter adjustment (RPA) for the at least one APC system; determining a status of the at least one APC system requested; determining whether the at least one APC system has necessary data to perform the RPA; and transmitting the required data to the at least one APC system.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein:

FIG. 4 shows a flow diagram of one embodiment of a method of operation of the system of FIG. 3.

FIGS. 5-12 show tables listing illustrative operation modes for the system of FIG. 3.

DETAILED DESCRIPTION

Figure 1:
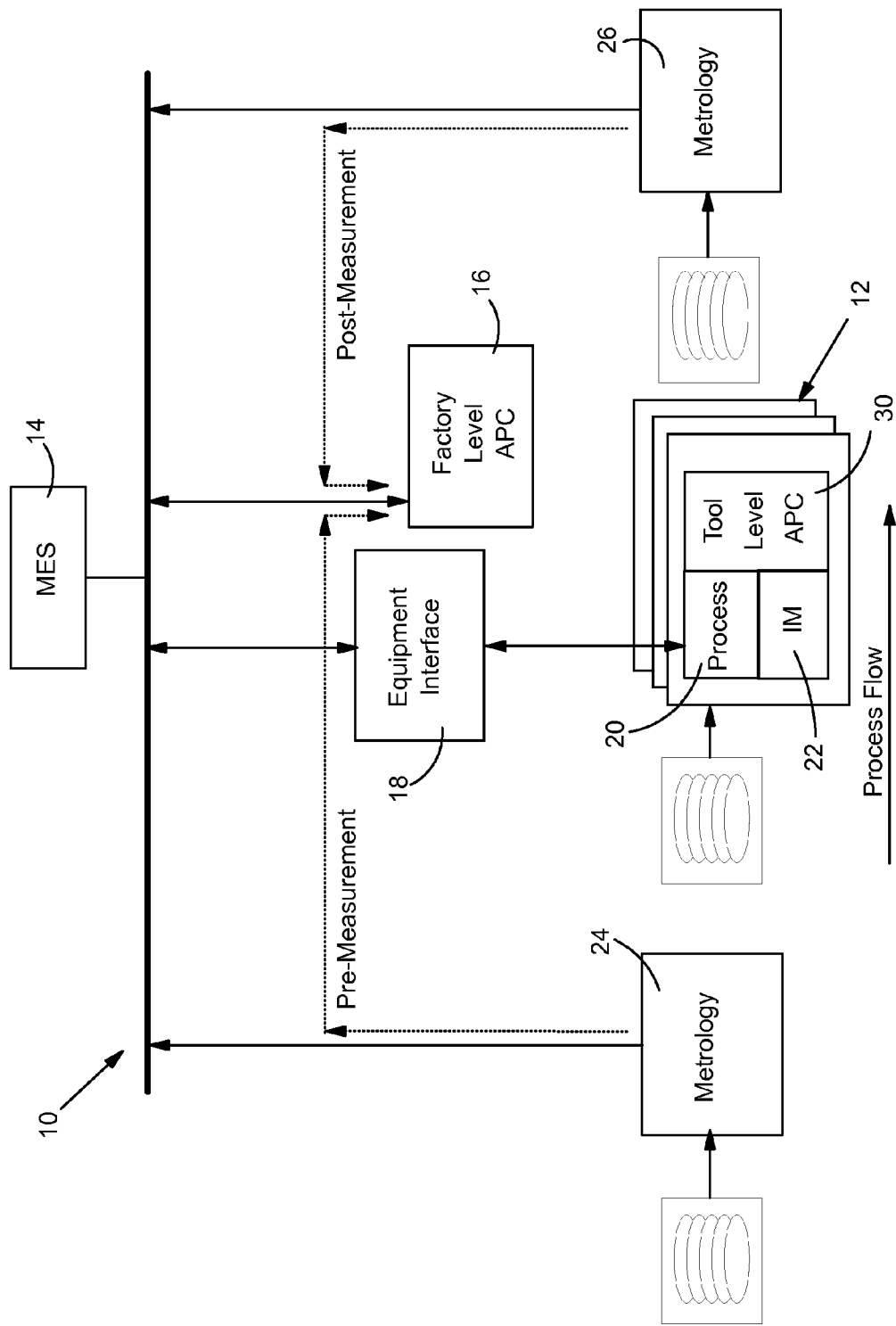
FIG. 1 shows a conventional semiconductor fabrication environment.
Figure 2:
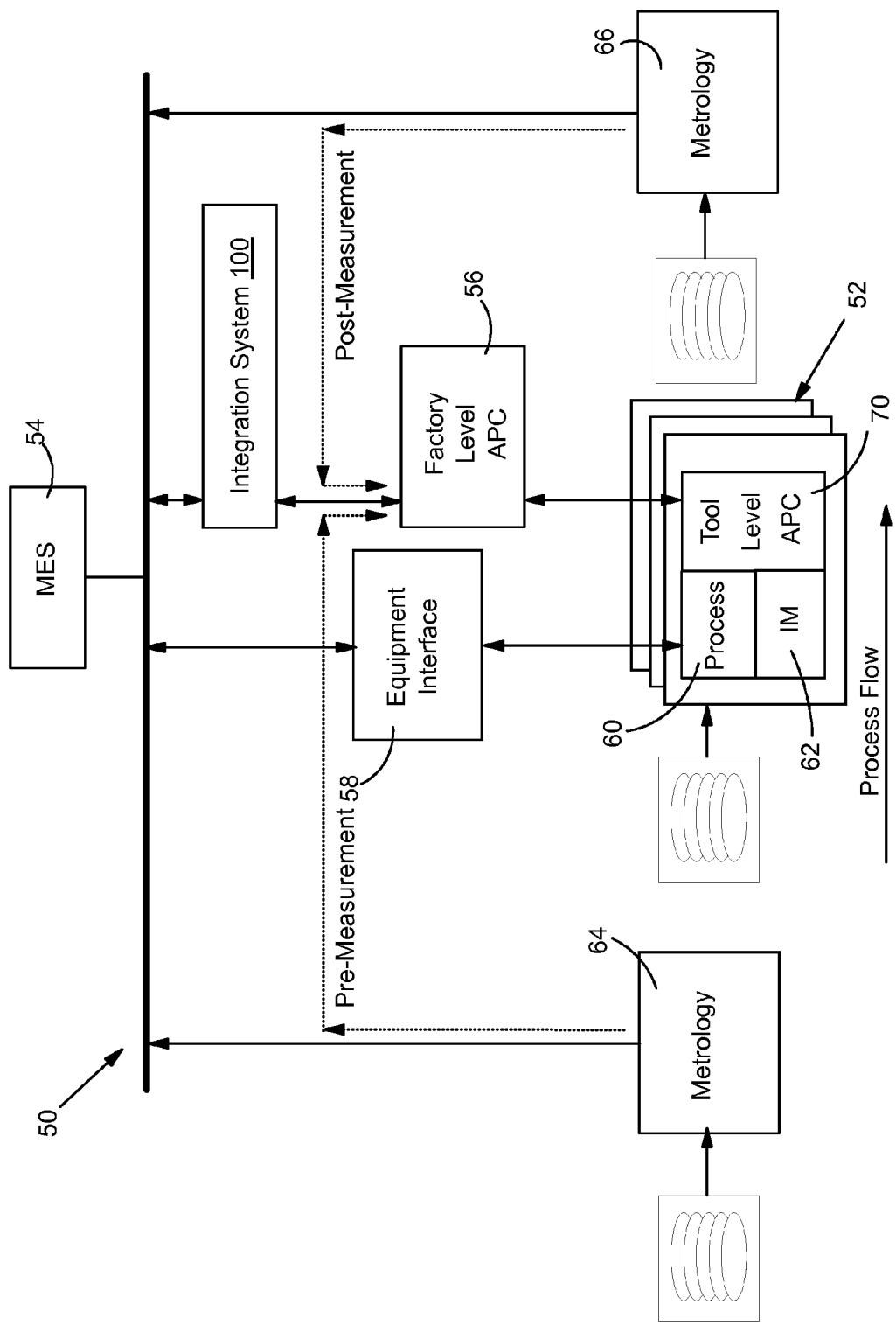
FIG. 2 shows a semiconductor fabrication environment according to the invention.

With reference to the accompanying drawings, FIG. 2 shows an illustrative semiconductor fabricator environment 50 according to the invention. Environment 50 includes a number of tools 52, a manufacturing execution system (MES) 54 that controls all product movements through the environment, i.e., it schedules product movements, a factory level APC (FL-APC) system 56, and an equipment interface (EI) 58 that interfaces between MES 54 and FL-APC system 56 with different tools. Although not shown, middleware may be present for communication between MES 54, FL-APC system 56 and EI 58. As known in the art, FL-APC system 56 uses measurements of particular structures before (pre) and after (post) a particular processing step, and provides corrections to recipes (i.e., a recipe parameter adjustment (RPA)) for feeding forward and/or feeding back to tools 52 to achieve a better product.

Continuing with FIG. 2, each tool 52 includes process equipment 60 particular to its function, e.g., an etching chamber, gas source, appropriate electronics, etc. for an etching tool. Metrology instruments may be provided as an integrated metrology (IM) system 62 and/or external metrology systems 64 and 66. Each tool 52 also includes a tool level APC (TL-APC) system 70, which similarly to FL-APC system 56 may use pre-measurements and post-measurements of particular structures and provide corrections to recipes for feeding forward and/or feeding back to process equipment 60 of the tool or to other tools 52 to achieve a better product. A factory level-tool level advanced process control (FL-TL APC) integration system 100 (hereinafter "integration system") is provided that integrates operation of FL-APC system 56, MES 54, EI 58 and any number of TL-APC systems 70. It should be recognized that the positioning of integration system 100, as well as MES 54, EI 58, FL-APC system 56, etc., is only illustrative, and that the positioning can be changed as required by a user.

Figure 3:
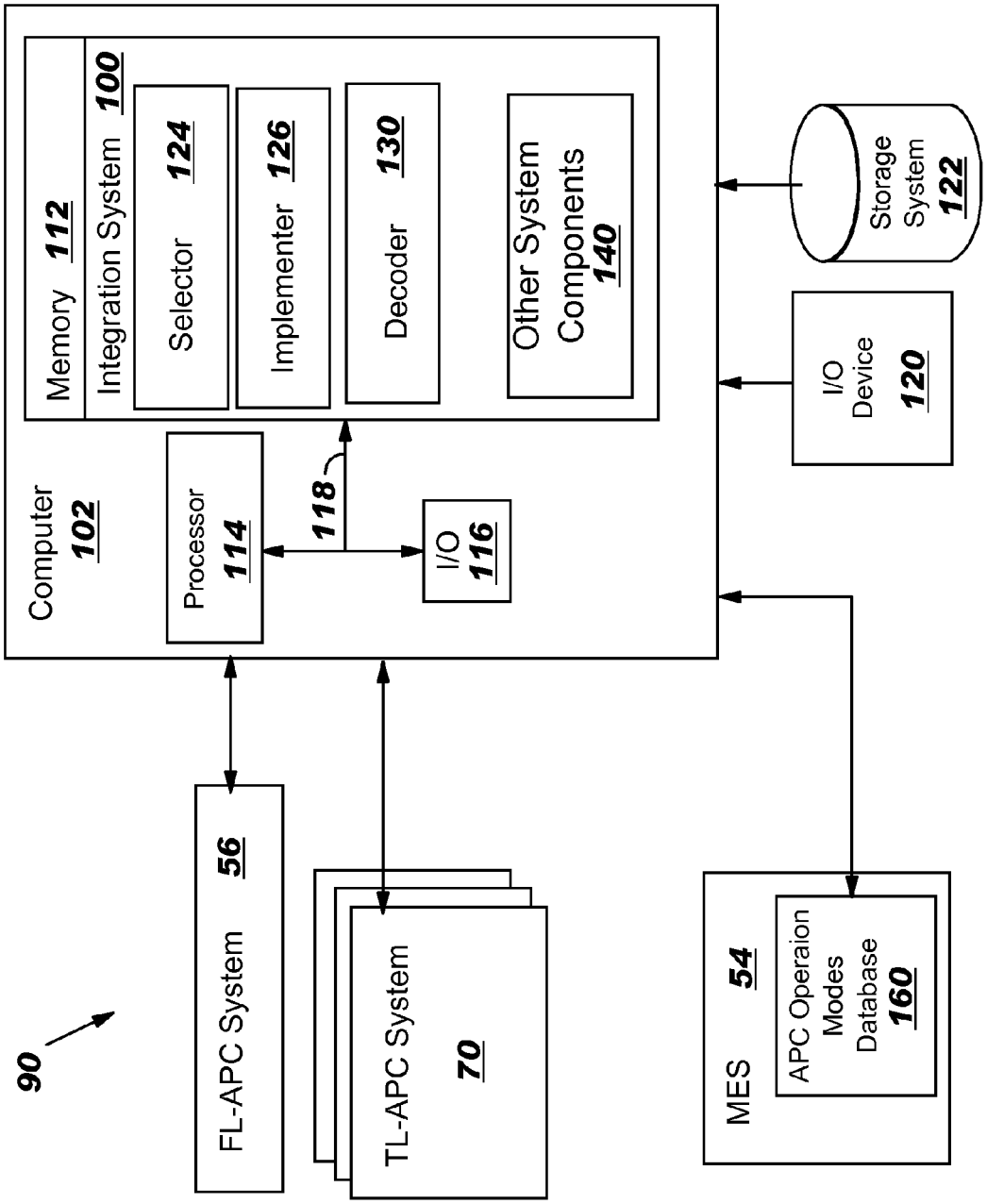
FIG. 3 shows a block diagram of a factory level-tool level advance process control integration system according to one embodiment of the invention.

Referring to FIG. 3, a block diagram of one embodiment of integration system 100 in accordance with the invention is shown. In this embodiment, integration system 100 is shown implemented on computer 102 as computer program code. To this extent, computer 102 is shown including a memory 112, a processor 114, an input/output (I/O) interface 116, and a bus 118. Further, computer 102 is shown in communication with an external I/O device/resource 120 and a storage system 122. In general, processor 114 executes computer program code, such as system 100, that is stored in memory 112 and/or storage system 122. While executing computer program code, processor 114 can read and/or write data to/from memory 112, storage system 122, and/or I/O device 120. Bus 118 provides a communication link between each of the components in computer 102, and I/O device 120 can comprise any device that enables user to interact with computer 102 (e.g., keyboard, pointing device, display, etc.).

Alternatively, a user can interact with another computing device (not shown) in communication with computer 102. In this case, I/O interface 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processor 114 may comprise a single processing unit, or be distributed across one or more processing units in one or more locations, e.g., on a client and server. Similarly, memory 112 and/or storage system 122 and/or APC operation modes database 160 (which may be part of either memory 112 or storage system 122) may reside at one or more physical locations.

Memory 112 and/or storage system 122 and/or APC operation modes database 160 (hereinafter simply "database 160") can comprise any combination of various types of computer-readable media and/or transmission media including magnetic media, optical media, random access memory (RAM), read only memory (ROM), a data object, etc. I/O interface 116 can comprise any system for exchanging information with one or more I/O devices. Further, it is understood that one or more additional components (e.g., system software, math co-processor, etc.) not shown in FIG. 3 can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices (e.g., a display) and/or storage system 122 could be contained within computer 102, not externally as shown. Computer 102 may also be implemented as part of systems that provide MES 54 and/or FL-APC system 56.

As discussed further below, integration system 100 is shown including a selector 124, an implementer 126, a decoder 130 and other system components 140. Other system components 140 may include any other functionality necessary for implementation of any integration system 100 not expressly described herein. In addition, integration system 100 includes a plurality of advanced processing control (APC) operation modes stored in database 160.

Turning to FIG. 4, a flow diagram of one embodiment of a method of operation of integration system 100 is illustrated. Description of FIG. 4 will be made in conjunction with FIGS. 2 and 3.

In a first step S1, a plurality of advanced process control (APC) operation modes are provided for selection by MES 54 that interacts with at least one of: a) FL-APC system 56, and b) at least one TL-APC system 70. Each of the APC operation modes may indicate a different operational setting for FL-APC system 56 and the at least one TL-APC system 70. FIGS. 5-12 show tables providing a non-exhaustive listing of illustrative operational settings that may be selected. In addition, each APC operation mode may also indicate an operational setting for: an external pre-measurement metrology tool 64 upstream from a tool 52 including a TL-APC system 70, an external post-measurement metrology tool 66 downstream from the tool including TL-APC system 70, an integrated metrology tool 62 of the tool including the TL-APC system, and/or use of an integrated metrology tool 62 as an external pre or post measurement upstream or downstream of the tool 52. Furthermore, each APC operation mode may indicate an 'APC criteria' such as lot-to-lot evaluation and/or wafer-to-wafer evaluation. Each APC operation mode may also indicate a duration for at least one portion of the APC operation mode. In this case, a 'duration' may indicate, for example, a number of wafers to be evaluated using the particular APC operation mode or a duration of a control job. A "control job" is a unit of work flow which is used to specify one or more process operations to be performed on specific lots or wafers on specific equipment.

In FIGS. 5-12, each row indicates a potential APC operation mode. Each APC operation mode may have some sort of name and/or classification (not shown) for identification purposes. The examples shown provide indications relative to: FL-APC system 54 and TL-APC system 70 on-off, i.e., YES or NO, the APC criteria (e.g., lot-to-lot (L2L) and/or wafer-to-wafer (W2W)), the mode for FL-APC system 56 (i.e., active or passive) and the mode for TL-APC system 70 indicated (i.e., active or disabled). In addition, the scenario of operation is also indicated. FIG. 5 shows factory level control without tool level control (with external 64, 66 and integrated 62 metrology). FIG. 6 shows tool level control without factory level control (with external 64, 66 and internal 62 metrology). FIG. 7 shows factory level control with tool level control, where the factory level control (FLC) uses external metrology 64, 66 and the tool level control (TLC) uses integrated metrology 62. FIG. 8 shows factory level control with tool level control, where the factor level control (FLC) uses integrated metrology 62 and the tool level control (TLC) uses external metrology 64, 66. FIG. 9 shows factory level control with tool level control, where only external metrology 64, 66 is used. FIG. 10 shows factory level control with tool level control, where only integrated metrology 62 is used. FIG. 11 shows a special set of APC operation modes in which the factory level control in a simulation mode using external metrology. The FIG. 11 APC operation modes are used during initial operation of a new tool and its TL-APC system 70 such that integration system 100 can be used to check operation of a new TL-APC system 70. FIG. 12 shows another special set of APC operation modes in which the factory level control operating in a simulation mode using integrated metrology is selectable for testing of a new TL-APC system 70.

Returning to FIG. 2-4, in a next step S2, a selection of an APC operation mode may be made via a selector 124, which may be provided as part of integration system 100 or as part of MES 54. Selector 124 may provide for selecting an appropriate APC operation mode in any now known or later developed fashion. The APC operation mode will be passed along with other logistic information to FL-APC system 56 and the appropriate APC operation will be performed.

In step S3, a selected APC operation mode is implemented by implementer 126. Implementer 126 implements the selected APC operation mode using FL-APC system 56 to control the at least one TL-APC system 70 based on the selected APC operation mode. That is, FL-APC system 56 is always enabled. As indicated in FIGS. 5-12, where FL-APC system 56 is not used, it remains in a 'passive' mode in which it monitors and coordinates TL-APC system 70 operation, regardless which APC operation mode is selected, FL-APC system 56 is required to perform all APC operations.

Each tool 52 and accordingly each TL-APC system 70 may operate using its own particular language. Accordingly, in one embodiment, the above-described method may also include translating data communicated between integration system 100, FL-APC system 56 and the at least one TL-APC system 70 using a decoder 130. In one embodiment, each tool 52 and TL-APC system 70 may have a set of instruction mappings for communication with MES 54, FL-APC system 56 and EI 58. In this fashion, any tool 52 and TL-APC system 70 can be integrated into environment 50.

In another embodiment, a method may provide the steps of providing MES 54 coupled to FL-APC system 56 that provides at least one of feedback and feedforward control for tool 52, wherein tool 52 includes a TL-APC system 70, and selecting an APC operation mode from a plurality of APC operation modes. As noted above, the plurality of APC operation modes indicate an operational setting for each of FL-APC system 56 and TL-APC system 70.

Figure 13:
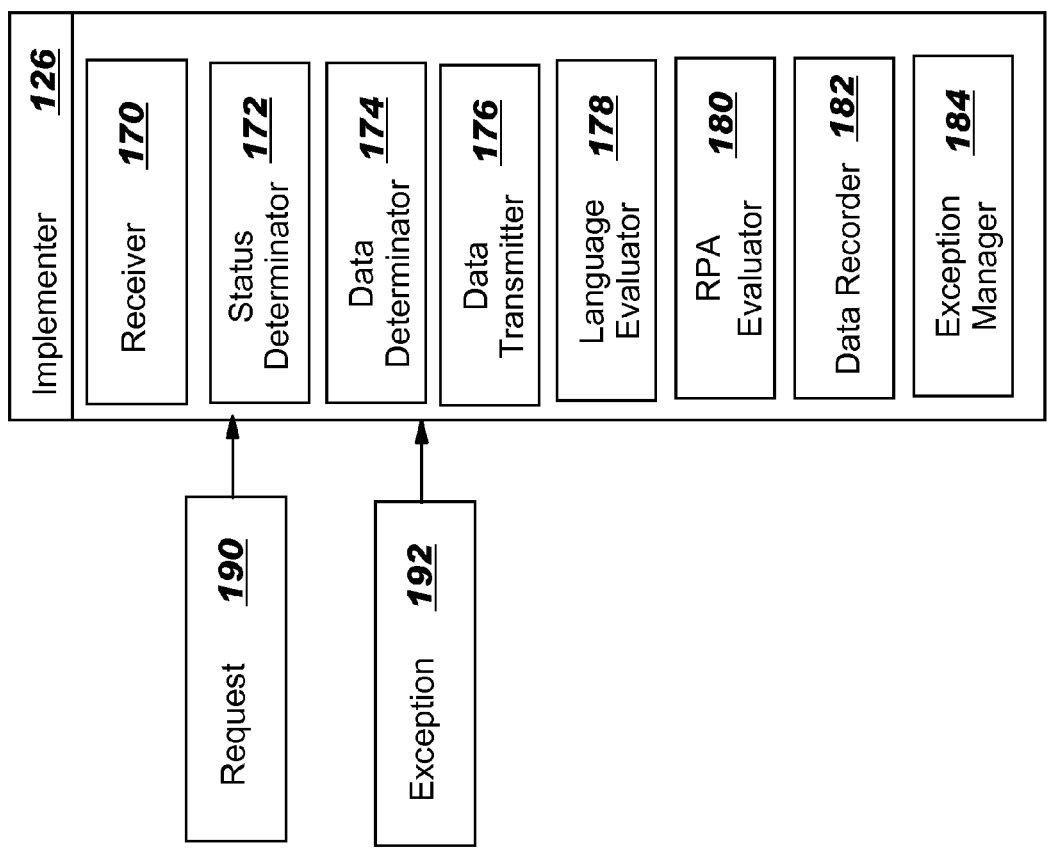
FIG. 13 shows one embodiment of an implementer of FIG. 3.
Figure 14:
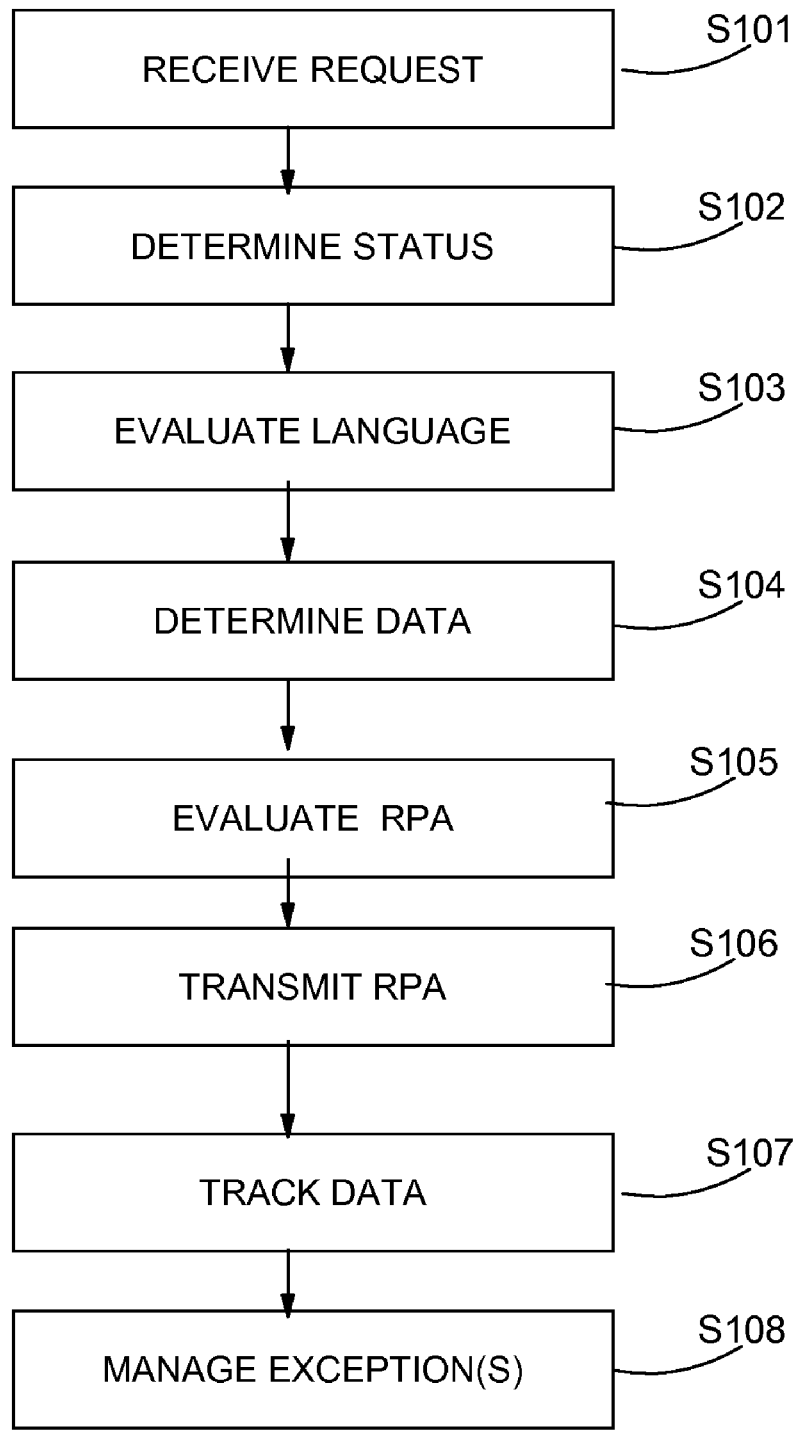
FIG. 14 shows one embodiment of a method of operation of the implementer of FIG. 13.

Turning to FIGS. 13-14, one embodiment of implementer 126 will now be described. As described above, implementer 126 implements an APC operation mode for at least one of a FL-APC system 56, and at least one TL-APC system 70. As shown in FIG. 13, implementer 126 may include a receiver 170, a status determinator 172, a data determinator 174, a data transmitter 176, a language evaluator 178, an RPA evaluator 180, a data recorder 182 and an exception manager 184.

Referring to FIG. 14, one embodiment of a method of operation of implementer 126 will be described in conjunction with FIG. 13. First, at S101, receiver 170 receives a request 190 from MES 54 (FIG. 2) for at least one APC system 56 (FIG. 2) and/or 70 (FIG. 2) (hereinafter referred to as "APC system(s) 56, 70"). Request 190 may include, inter alia, the APC operation mode and required data (e.g., any data required for an APC system to perform an RPA) for APC system(s) 56, 70. At S102, status determinator 172 determines a status of APC system(s) 56, 70 requested. That is, status determinator 172 checks the availability of the requested APC system(s) 56, 70. The status may include, inter alia, whether it is on, its current settings and whether the data received from it is valid.

Next, at optional S103, language evaluator 178 evaluates the required data to determine whether the required data is in a language usable by APC system(s) 56, 70 requested. As noted above, each APC system 56, 70 may use its own language, which may not conform with the required data. In the case where different languages are used, language evaluator 178 can be enabled to obtain a translation between languages. That is, where the required data is not in the language usable by APC system(s) 56, 70 requested, language evaluator 178 obtains a translation by invoking decoder 130 (FIG. 3), as described above.

Next, at S104, data determinator 174 determines whether APC system(s) 56, 70 has the necessary data to perform the RPA. This determination may include an evaluation of the APC system(s) 56, 70 to determine whether the data required to perform the RPA is present. For example, for an etching process, an RPA may require: a pressure, temperature, gas flow rate, duration, etc. If the requested APC system 56, 70 does not have the necessary data, data determinator 174 obtains the data and data transmitter 176 transmits the data to APC system(s) 56, 70.

Next, at S105, RPA evaluator 180 evaluates the RPA to determine whether the required data includes the necessary data to perform the RPA. RPA evaluator 180 gathers all the required data (e.g., target values, limits, parameters, etc), performs the specified algorithmic calculations, and verifies the validity of the calculated values.

At S106, data transmitter 176 transmits the required data to APC system(s) 56, 70. Data transmitter 176 may employ any now known or later developed mechanism for communicating data to APC system(s) 56, 70.

As an option, at S107, data recorder 182 may track a data exchange between APC system(s) 56, 70 and MES 54 (FIG. 2). Data recorder 182 may store the logistic and data information for tracking and analysis purposes.

As another option, at S108, exception manager 184 may manage exception(s) 192 from APC system(s) 56, 70. That is, any unexpected error(s) that occur at APC system(s) 56, 70 such as an inability to read an instruction, missing data, error detection, inoperable component, etc. The management may include any now known or later developed function to correct or address the exception, e.g., re-load of data, re-start of tool component, adjustment of process parameters, etc. For example, if the requested APC system is not available, exception manager 184 decides whether to put the wafer process job on hold or use an other available APC system to perform the RPA. In another example, if the calculated RPA values are out of acceptable ranges, then exception manager 184 may put the wafer on hold.

It is understood that the order of the above-described steps is only illustrative. To this extent, one or more steps can be performed in parallel, in a different order, at a remote time, etc. Further, one or more of the steps may not be performed in various embodiments of the invention. In addition, use of integration system 100 in a semiconductor fabrication environment 50 is only illustrative as the invention may find application in a number of different manufacturing settings.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., integration system 100), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of implementing an advanced process control (APC) operation mode for at least one of a factory level advanced processing control (FL-APC) system, and at least one tool level advanced processing control (TL-APC) system, the method comprising:
receiving a request from a manufacturing execution system (MES) for at least one APC system, the request including the APC operation mode and required data to perform a recipe parameter adjustment (RPA) for the at least one APC system;
determining a status of the at least one APC system requested;
determining whether the at least one APC system has necessary data to perform the RPA; and
transmitting the required data to the at least one APC system.

2. The method of claim 1, further comprising evaluating the required data to determine whether the required data is in a language usable by the at least one APC system, and translating the required data in the case that the required data is not in the language usable by the at least one APC system.

3. The method of claim 1, further comprising evaluating the required data to determine whether the required data includes the necessary data to perform the RPA.

4. The method of claim 1, further comprising tracking a data exchange between the at least one APC system and the MES.

5. The method of claim 1, further comprising managing an exception from the at least one APC system.

6. The method of claim 1, wherein the status determining includes determining whether the at least one APC system is on and current settings of the at least one APC system.

7. A system for implementing an advanced process control (APC) operation mode for at least one of a factory level advanced processing control (FL-APC) system, and at least one tool level advanced processing control (TL-APC) system, the system comprising:
   at least one computer including:
   a receiver for receiving a request from a manufacturing execution system (MES) for at least one APC system, the request including the APC operation mode and required data to perform a recipe parameter adjustment (RPA) for the at least one APC system;
   a status determinator for determining a status of the at least one APC system requested;
   a data determinator for determining whether the at least one APC system has necessary data to perform the RPA; and
   a data transmitter for transmitting the required data to the at least one APC system.

8. The system of claim 7, further comprising a language evaluator for evaluating the required data to determine whether the required data is in a language usable by the at least one APC system, and obtaining a translation of the required data in the case that the required data is not in the language usable by the at least one APC system.

9. The system of claim 7, further comprising an RPA evaluator for evaluating the required data to determine whether the RPA includes the necessary data to perform the RPA.

10. The system of claim 7, further comprising a data recorder for tracking data exchange between the at least one APC system and the MES.

11. The system of claim 7, further comprising an exception manager for managing an exception from the at least one APC system.

12. The system of claim 7, wherein the status determinator determines whether the at least one APC system is on and current settings of the at least one APC system.

13. A computer program product comprising a non-transitory computer readable medium storing a computer readable program for implementing an advanced process control (APC) operation mode for at least one of a factory level advanced processing control (FL-APC) system, and at least one tool level advanced processing control (TL-APC) system, wherein the computer readable program when executed on a computer causes the computer to perform the following:
   receiving a request from a manufacturing execution system (MES) for at least one APC system, the request including the APC operation mode and required data to perform a recipe parameter adjustment (RPA) for the at least one APC system;
   determining a status of the at least one APC system requested;
   determining whether the at least one APC system has necessary data to perform the RPA; and
   transmitting the required data to the at least one APC system.

14. The program product of claim 13, further comprising evaluating the required data to determine whether the required data is in a language usable by the at least one APC system, and translating the required data in the case that the required data is not in the language usable by the at least one APC system.

15. The program product of claim 13, further comprising evaluating the required data to determine whether the RPA includes the necessary data to perform the RPA.

16. The program product of claim 13, further comprising tracking data exchange between the at least one APC system and the MES.

17. The program product of claim 13, further comprising managing an exception from the at least one APC system.

18. The program product of claim 13, wherein the status determining includes determining whether the at least one APC system is on and current settings of the at least one APC system.

\* \* \* \* \*